July 7, 1953

F. C. MOCK 2,644,513

GAS TURBINE FUEL FEED AND POWER CONTROL DEVICE
RESPONSIVE TO SPEED AND AIR DENSITY

Filed Oct. 6, 1945

INVENTOR.
FRANK C. MOCK
BY
ATTORNEY

Patented July 7, 1953

2,644,513

UNITED STATES PATENT OFFICE 2,644,513

GAS TURBINE FUEL FEED AND POWER CONTROL DEVICE RESPONSIVE TO SPEED AND AIR DENSITY

Frank C. Mock, South Bend, Ind., assignor to Bendix Aviation Corporation, South Bend, Ind., a corporation of Delaware Application October 6, 1945, Serial No. 620,755

22 Claims. (Cl. 158—36.4)

This invention relates to a fuel-feed and power control device for gas turbines, jet propulsion machines or engines and like power plants utilizing the force or energy produced by the combustion and expansion of fuel and precompressed air; it is particularly adapted for jet propulsion power plants for aircraft wherein the air is compressed into a chamber constituting part of a generator, at which point it is heated by the combustion of fuel and the air and products of combustion passed through a turbine for driving a compressor and then discharged through a reaction jet to propel the aircraft; and power plants for aircraft wherein a gas turbine drives the propeller of the aircraft and may in addition drive a compressor for supplying air to a combustion chamber or generator, and wherein also the exhaust from the turbine may be discharged through a reaction jet to obtain a propulsion effect augmenting that of the propeller.

A relatively simple power control device for gas turbines and jet propulsion engines may be had by operatively interconnecting an engine-driven governor, a metering needle or feed valve and a pilot's control lever in a manner such that the governor functions to establish equilibrium when the valve has been adjusted to obtain a selected speed as determined by the position of the lever. However, such a control I have found has several major deficiencies. It permits increasing turbine speed for a given governor setting with increasing altitude, due to the fact that less fuel is required to maintain the turbine speed as the entering air density decreases and the governor in positioning the feed valve at a more nearly closed position will govern at a higher turbine speed. Also, upon sudden acceleration, by suddenly resetting the governor for a higher speed, the governor moves the feed valve to wide open position producing an extremely high proportion of fuel to air and dangerously high burner temperatures, particularly at high altitude. In addition, upon sudden change in the governor setting to decelerate the turbine, the governor tends to fully close the feed valve causing the burner to go out.

An object of the present invention is to provide a relatively simple yet highly effective fuel feed or power control device for power plants of the type specified incorporating improved means for automatically adjusting the rate of fuel feed in relation to changes in pressure and/or temperature of the air flowing to the engine.

Another and more specific object is to provide a device for feeding fuel to the burners of gas turbine and like engines for aircraft wherein the rate of fuel feed for a given position of a governor controlled feed valve is automatically varied with changes in altitude.

A further object is to provide a device for feeding fuel to the burners of gas turbine engines in which a fuel feed valve is controlled by a governor or like speed responsive device and the differential pressure across the valve is varied as a function of entering air density.

Another object is to provide a device for feeding fuel to burners utilized in gas turbines and jet machines or engines for aircraft incorporating an improved altitude or barometric correction unit or system.

A further object is to provide a device of the class specified having improved idling characteristics.

A still further object is to provide a fuel feeding device for jet machines or engines, gas turbines and like power plants which combines or coordinates a manually-operable feed valve, speed governor and barometric correction to the best advantage from a standpoint of simplicity and efficiency.

The foregoing and other objects and advantages will become apparent in view of the following description taken in conjunction with the drawings, wherein.

Figure 1:
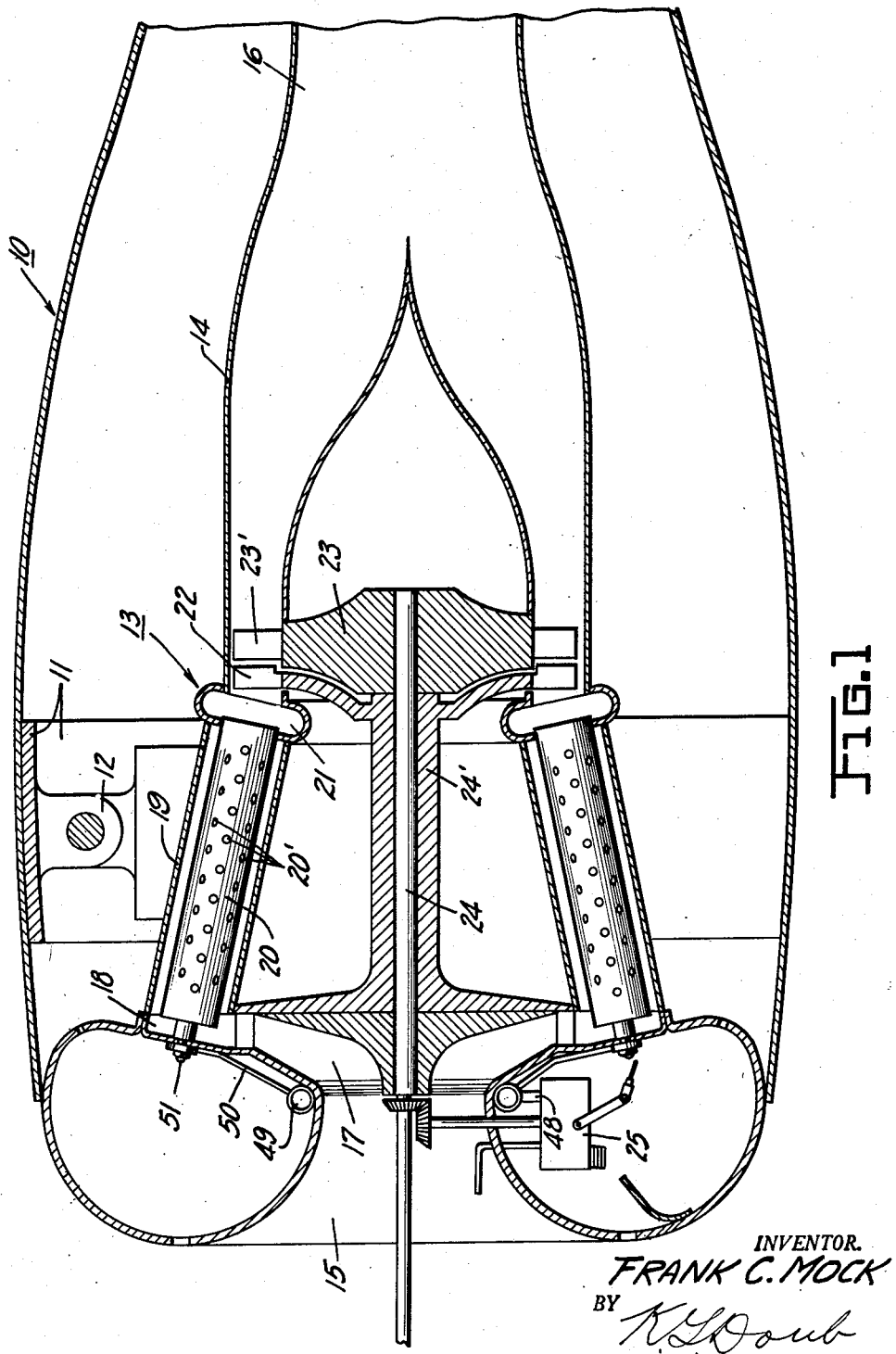
Figure 1 is a substantially central longitudinal sectional view of a gas turbine or jet propulsion machine or engine incorporating a fuel-feed and power-control device in accordance with the present invention.

Referring first to Figure 1, an aircraft engine nacelle, indicated at 10, has supported therein as by means of ring 11 and brackets 12 a jet propulsion engine or gas turbine power plant generally indicated at 13 and including an outer casing 14, flared or curved at its front extremity to define an air inlet 15 and contoured at its rear extremity to define a reaction tube 16. A rotary air compressor 17, shown as a centrifuged blower but which may also be of the axial flow type, forces air into an annular header 18 which supplies it to a plurality of peripherally-spaced cylinder-like generators or burner chambers 19 containing burners 20 having air-inlet holes 20' in the peripheral walls thereof. The burners 20 discharge into a collector ring 21 arranged to deliver the hot air and products of combustion through a set of stationary directing blades 22 against the blades 23' of a turbine rotor 23. The turbine 23 and air compressor 17 are mounted on a common shaft 24 rotatably supported by bearing 24'. Air entering the inlet 15 is picked up by the compressor, which acts to direct the air into header 18 and chambers 19 and thence into the burners 20 through holes 20', where heat is added by the combustion of fuel. The expanded air and products of combustion are directed against the blades 23' of the turbine 23 to drive the compressor and are then discharged to the atmosphere through the reaction tube 16 to effect propulsion of the plane. Propulsion of the plane may also, or instead, be accomplished by a propeller driven off of a forward extension of shaft 24, usually through suitable reduction gearing, not shown.

Figure 2:
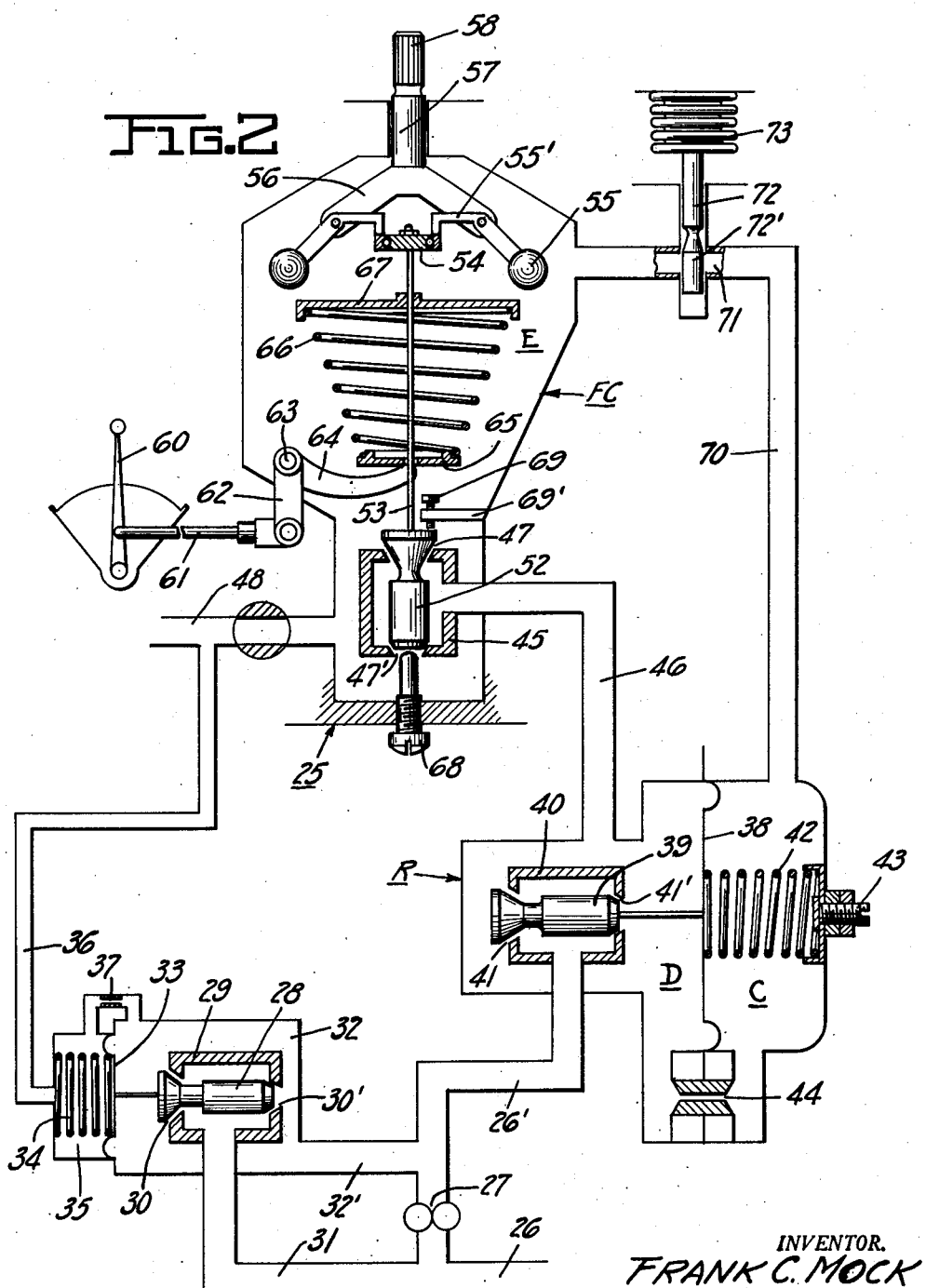
Figure 2 is a detail view in sectional diagram of the fuel-feed and power-control device.

Referring now to Figure 2, the various parts of the fuel-metering and power-control device are shown schematically but in the device as actually built the parts are arranged compactly in a single unit or housing generally indicated at 25, which as indicated in Figure 1, may be located in the annular chamber defined by the flared front extremity of the casing 14 and which chamber is vented to atmospheric air or ram pressure. A fuel-inlet conduit 26 receives fuel from a suitable source of supply such as a fuel tank, not shown, and has mounted therein a fuel-pressuring means such as an engine or turbine-driven pump 27 which delivers fuel under pressure to a regulator unit, to be described, by way of conduit 26'. Fuel pump delivery pressure may be maintained at a predetermined value over and above discharge or nozzle pressure by means of a balanced by-pass valve 28 mounted in a housing 29 having fuel inlet ports 30, 30' and communicating with the supply conduit 26 on the low-pressure side of the fuel pump 27 by way of return conduit 31, said valve housing in turn being mounted in a chamber 32 communicating with the high-pressure side of the said fuel pump by means of conduit 32'. A diaphragm 33, backed by a spring 34, is connected to the stem of valve 28 and forms a movable wall of chamber 35 which is vented to metered fuel or discharge nozzle pressure by means of conduit 36. Spring 34 determines the pressure above control discharge pressure at which valve 28 will open and by-pass fuel to the low-pressure side of pump 27. The chamber 35 may be vented to chamber 32 by means of bleed 37, to permit air to escape by way of conduits 36 and 48 to the fuel discharge nozzles and ensure proper functioning of valve 28.

A regulator unit is generally indicated at R and includes a diaphragm 38 which provides a movable partition wall between chambers D and C, and a balanced type of regulator or fuel valve 39 which has its stem connected to said diaphragm and is mounted in a housing 40 receiving fuel from conduit 26' and provided with ports 41, 41' discharging into chamber D. The diaphragm 38 is engaged by a spring 42 adjustable by means of screw 43. This spring is of a spring rate such as will maintain a predetermined substantially constant differential across said diaphragm. A bleed 44 communicates chamber C with chamber D and functions in a manner to be described.

A fuel control unit is generally indicated at FC; it includes a chamber E having mounted therein a valve housing 45 receiving fuel from chamber D of the regulator by way of conduit 46 and provided with oppositely disposed dual metering or feed orifices 47, 47' discharging into chamber E, from which the metered fuel flows by way of conduit 48 to an annular header or intake manifold 49 (see Figure 1) and thence to the individual burners through fuel lines 50 and discharge nozzles 51. These nozzles may, for example, be of the type illustrated in my copending application Serial No. 557,812, filed October 9, 1944, now Patent No. 2,581,275.

A balanced type fuel feed or throttle valve 52 controls the variable feed restrictions or orifices 47, 47', said valve having an extended stem or rod 53 which at its outer or free end is connected to the inner race of a bearing 54, the outer race of said bearing being contacted by fingers 55' of governor weights 55 pivotally connected to arms 56 projecting from a governor shaft 57 rotatably supported in the main housing or casing 25 and provided with a splined end 58 adapted for driving connection with the turbine or engine for rotation therewith.

A pilot's power control lever or quadrant 60 connects through rod 61 and link 62 with a shaft 63 on which is secured a lever 64 having a bifurcated free end engaging a plate 65 mounted on the one end of a conical spring 66, the opposite end of said spring engaging a plate 67 secured on the stem or rod 53 of valve 52. When spring 66 is compressed, valve 52 is moved toward open position against the resistance of the rotating governor weights 55, the latter maintaining the valve in a balanced condition or in equilibrium for the speed selected by the position of the power control lever 60.

An adjustable contact member such as screw 68 positively determines the idling position of valve 52, and a similar member 69 carried by a bracket 69' limits the maximum opening movement of said valve.

Chambers C and E are placed in restricted variable flow communication by means of passage 70 having an orifice or port 71 therein, the area of which is controlled by the active contour 72' of needle 72 connected to the movable end of a capsule or bellows 73 responsive to changes in pressure and temperature and adapted to be mounted at a point where it will be exposed to the ram pressure and the temperature of the air flowing to the compressor and turbine.

The operation is as follows:

Ordinarily the system would be filled with fuel to the discharge nozzles 51, but assuming it to be empty at ground level, then valve 39 would be in wide open position and the feed valve 52 would be at idle position. If the engine is now cranked, fuel will flow through conduits 26, 26' and ports 41, 41' into and fill chamber D of the regulator R and thence by way of conduit 46 through ports 47, 47' into chamber E of the fuel control unit, from which it flows by way of conduit 48, manifold ring 49 and fuel lines 50 to the discharge nozzles 51; and fuel will also flow through bleed 44 into chamber C of the regulator R and then past the needle 72 through passage 70 to chamber E.

The spring rate of spring 42 with respect to the range of movement of diaphragm 38 is such that for all practical purposes, the force exerted by said spring may be considered as remaining constant, and therefore the respective pressures in chambers D and C will tend to bear a constant relative value; thus the valve 39 will open or close to maintain the pressure in D equal to that in C plus the pressure equivalent of spring 42. Hence a predetermined substantially constant differential will be maintained across said diaphragm, varying only momentarily as the pressure in either of said chambers is varied.

The chambers D and E are connected by two passages in parallel, one comprising passage 46 and feed orifices 47, 47', and the other comprising fixed orifice 44, passage 70, and variably controlled orifice 71. With this arrangement the drop in pressure from chamber D to chamber E across orifices 47, 47' will, of course, always be equal to the sum of the drop in pressure from chamber D to chamber C across fixed orifice 44 and the drop in pressure from chamber C to chamber E across variable orifice 71. The substantially constant drop across orifice 44 as determined by spring 42 creates a constant rate of fuel flow through orifice 44 which must also pass through orifice 71. The rate of flow through orifice 71 thus being substantially constant, the drop in pressure across orifice 71 will vary substantially inversely as the square of the effective area of the orifice as determined by the capsule 73. As a consequence, the regulator R functions to establish an absolute pressure in D which is greater than the pressure in C by the pressure equivalent of spring 42, and at the same time it establishes an absolute pressure in C sufficiently greater than the pressure in E that fuel can be forced through the available area of orifice 71 at the rate determined by the fixed orifice 44 and the constant head thereacross. The metering head across orifices 47, 47' is therefore equal to the sum of the constant head across orifice 44 plus the variable head across orifice 71, the latter being under the control of the capsule 73.

The quantity of fuel supplied to the burners through orifices 47, 47' may be varied by varying the area of orifices 47, 47', and/or by varying the head (pressure in D minus pressure in E) causing flow. The area of the orifices 47, 47' is under the direct control of the governor weights 55, whereas the differential head across the orifices is under the control of regulator unit R and its interrelated density controlled valve 72 which controls the said differential head, in the manner heretofore explained, as a function of entering air density or altitude.

To accelerate or decelerate at a given altitude, the pilot simply advances or retracts lever 60 and through lever 64, spring 66 and feed valve 52 adjusts the effective area of orifices 47, 47', simultaneously resetting the governor weights 55 through rod 53; whereupon the engine or turbine speeds up or slows down to a speed commensurate with the rate of feed determined by the position of lever 60, and the governor weights then balance the valve against spring 66 at the selected speed.

Opening or closing movement of valve 52 resulting from operation of lever 60 momentarily varies the pressure in chamber D and consequently changes the differential across diaphragm 38 from the value set by spring 42; however, the valve 39 is immediately repositioned to restore the differential across diaphragm 38 and also the differential across orifices 47, 47', the latter being thereafter maintained substantially constant for a given position of aneroid valve 72.

Upon decrease in the density of the air flowing to the engine less fuel is required to drive the turbine and compressor at a given speed. With such change in density the capsule 73 expands, thereby increasing the effective area of orifice 71 and correspondingly decreasing the head across this orifice. This produces a corresponding reduction in head across feed orifices 47, 47' and results in diminished fuel flow to the burners as is desired. By properly contouring valve 72 substantially complete density compensation is obtainable such that the speed of the turbine remains practically constant upon change in altitude without requiring a change in the position of governor weights 55 and fuel valve 52. If valve 72 produces only partial density compensation, the turbine will tend to speed up whereupon the weights 55 and valve 52 will be repositioned to maintain the turbine speed at a value more nearly equal to its prior value than if the governor was the sole control of the fuel flow to the burners.

Figure 3:
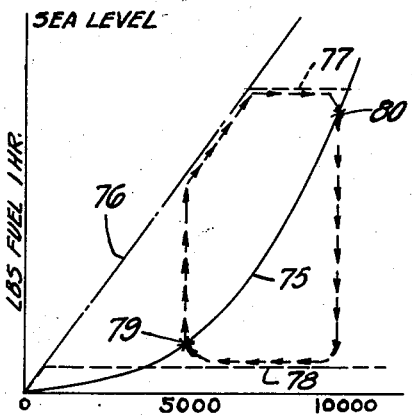
Figures 3 to 6, inclusive, are curve charts illustrating the fuel-feed characteristics of the device.

The throttle valve stop 69 preferably should be set to correspond to the opening of valve 52 at maximum speed condition at maximum air density. This stop therefore will limit the maximum rate of fuel flow to the burners during acceleration. This function will be more apparent from Figure 3 which constitutes a rough approximation of the acceleration and deceleration characteristics of the herein disclosed power control device at maximum density or ground level conditions. The full line curve at 75 represents the fuel feed required for steady operation at various speeds at ground level. In the usual engine of the type here involved, the fuel feed vs. speed curve is approximately a cubic curve, the fuel rate varying substantially as the cube of the speed. The dot and dash line 76 represents the fuel flow capacity vs. speed characteristics of the supply pump. By using a stop 69 limiting the maximum opening of valve 52, the maximum rate of fuel delivery to the burners is limited as illustrated by the horizontal line 77, the stop preferably being set to correspond to the fuel required for maximum desired turbine speed although if desired a somewhat higher fuel rate could be permitted. The line 78 represents the fuel supply characteristic with valve 52 against stop 68, this stop being set such that the intersection of curves 78 and 75 corresponds to the desired idling speed for the turbine at ground level.

Let it be assumed that the engine is operating at speed 79 and the pilot moves lever 60 to a position corresponding to speed 80, the governor spring 66 will open valve 52 against stop 69 to accelerate the engine. There is an immediate drop in pressure in chamber D, momentarily decreasing the differential across diaphragm 38, whereupon the latter will act to restore the differential to its original value by opening valve 39. The fuel supply to the burners will rise suddenly along the vertical arrow line to the supply pump capacity line 76 and will follow it until the maximum rate of fuel flow as set by stop 69 is attained, whereupon it follows the horizontal line 77 until the speed at 80 is approached at which time the governor partially closes valve 52 and establishes equilibrium operation at point 80.

Should the pilot wish to decelerate back to point 79, he moves the lever 60 back to its prior position, whereupon the governor weights move valve 52 against the idle stop 68. There is an immediate rise in pressure in chamber D but the diaphragm 38 repositions valve 39 to restore the differential across valve 52. As valve 52 moves against the stop 68 the fuel flow suddenly decreases along the arrow line to the line 78 and follows it along until the speed at 79 is approached, at which time the governor spring partially opens valve 52 and establishes equilibrium operation at point 79.

Upon a decrease in the density of the air flowing to the engine less fuel is required to drive the turbine and compressor at a given speed, and unless the maximum rate of fuel delivered to the engine on acceleration is drastically limited, very much higher temperatures will be experienced during acceleration at altitudes, than at corresponding conditions at sea level, due to extremely rich fuel-air ratios.

Figure 4:
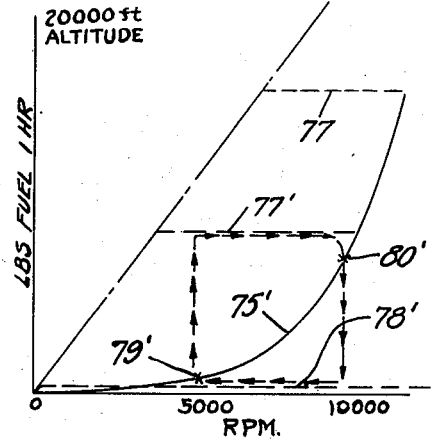

For an engine of the type herein described, the fuel rate required to maintain a given speed varies approximately directly with the entering air density. In Figure 4 the curve 75' (fuel required at steady speed) illustrates the fuel vs. speed characteristics at altitude, the rate of fuel feed being much less than at ground level at any given speed. Without density compensation the danger of overheating and burning out turbines blades as a result of oversupply of fuel on acceleration becomes very great. However, with the device herein disclosed the differential pressure across the feed valve 52 is decreased as altitude is gained due to the fact that the aneroid 73 is extended and valve 72 increases the effective area of orifice 71, thereby decreasing the differential pressure across valve 52 as maintained by regulator R. As a consequence, the rate of fuel feed for a given position of valve 52 is reduced and with valve 52 against stop 69 the maximum fuel delivery rate is limited as indicated by dotted line 77' which is of considerably lower value than that of line 77 of Figure 3, this line being illustrated in Figure 4 also, for purpose of comparison.

If at this altitude, the position of lever 60 were changed to accelerate from the point 79' to 80', the valve 52 would open wide and the fuel flow rate would increase along the vertical arrow lines and thence horizontally until the speed at 80' was approached, whereupon the governor would partially close valve 52 to establish equilibrium operation at point 80'. Were it not for the density compensating feature, fuel would be supplied to the burners during acceleration at the maximum rate corresponding to line 77, the excessive fuel producing a flame temperature so high that the burner tubes and turbine blades would be damaged.

Deceleration results in a decrease in fuel rate along the arrow line to the minimum fuel rate curve 78' and thence horizontally until speed 79' is approached, whereupon the valve 52 would partially open under the influence of the governor and equilibrium operation at 79' would be established.

Figure 5:
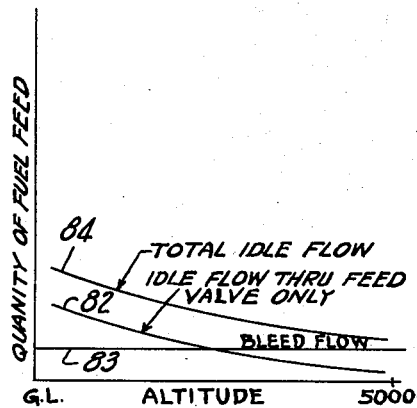
Figure 6:
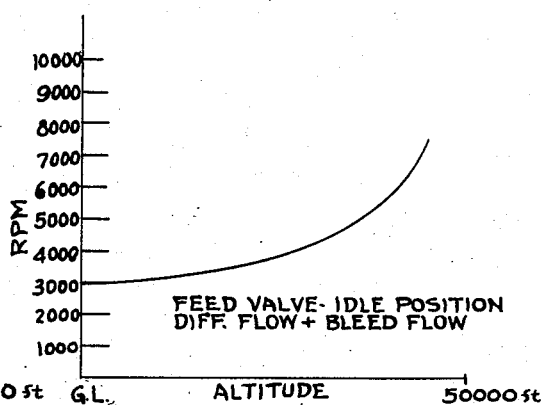

The curve charts of Figures 5 and 6 illustrate the idling characteristics of the improved power control device. The curve indicated at 82 in Figure 5 is an approximation of the idle flow which takes place through orifices 47, 47' at various altitudes with the feed valve 52 against the idling stop 68, the idling flow decreasing with increase in altitude due to the compensating effect of the aneroid needle 72. The straight line indicated at 83 represents the flow which takes place through the bleed 44 and port 71 direct to the chamber E. This flow will remain substantially constant since the bleed 44 is fixed and the differential thereacross is maintained substantially constant by the spring 42, only minor variations occurring when the respective pressures in chambers C and D become momentarily unbalanced. This bleed flow is absorbed or included in the fuel feed to the turbine or engine and is additive to the feed through orifices 47, 47' under all conditions of operation. The curve indicated at 84 represents the total idle flow, viz., the flow through orifices 47, 47' plus the bleed flow through bleed 44 and orifice 72'.

It is highly desirable that the fuel feed at idling be such that at any altitude a pilot flame will be maintained of sufficient strength to prevent blow-out of the burner should the throttle valve 52 be suddenly moved back to idling from a power setting, and toward this end it is desirable to provide an increasing idling speed with increase in altitude. However, for normal power settings above idle, a substantially constant speed with variations in altitude is desired. The problem of properly contouring the aneroid needle 72 or other valve surface to correlate power fuel-feed altitude compensation with idle fuel-feed altitude compensation is thus rendered difficult. The constant addition of a fixed relatively small quantity of uncompensated fuel through bleed 44 and port or orifice 71 simplifies or solves this problem. The curve 82, as pointed out, represents the compensated flow through orifices 47, 47', the rate of flow in a fully altitude-compensated system decreasing with increase in altitude at such a rate that the fuel flow represented by curve 82 would produce a substantially constant speed at all altitudes. The substantially constant bleed flow superimposed upon the flow of curve 82 represents a greater percentage increase in flow at altitude than at ground level and consequently the idling speed will increase with altitude in a manner shown approximately in Figure 6.

The bleed flow has a similar but reduced effect at higher power settings. As the fuel flow through orifices 47, 47' increases with increase in power setting, the constant bleed flow has a diminished effect and becomes negligible at any substantial power setting.

In Figure 6, the idling differential flow plus the bleed flow is represented as producing a speed of approximately 3,000 R. P. M. at ground level and a speed of approximately 6,500 R. P. M. at high altitude, an idling characteristic which may be suitable for certain machines.

It is preferred to make the valve 39 and coacting ports 41, 41' of large flow capacity with respect to the valve 52 and ports 47, 47', so that the differential travel of spring 42 may be of a relatively small value and produce a quick response when valve 52 is opened and closed.

Instead of varying the area of orifice 71 in relation to changes in density, this orifice could be fixed and the area of orifice 44 varied, in which case the variable drop across orifice 71 would be obtained by varying the quantity of bleed flow through such a fixed orifice, rather than by varying the area of the orifice for a fixed flow. In either case, the drop from chamber D to chamber E would be varied at a given position of valve 52 to accomplish the desired function of altitude compensation.

It will also be understood that the device will operate with a direct connected manual or automatic feed valve, or with an interposed speed governor as shown.

The foregoing and other changes in construction, arrangement and design of the various parts of the device may be made without departing from the spirit or scope of the invention as defined by the appended claims.

I claim:

1. For use in a fuel-feeding system for power plants utilizing a burner or generator to which air is supplied under pressure, a fuel conduit for conducting fuel to the burner having a variable metering restriction therein, means for creating a flow of fuel under pressure through said conduit, an element for varying the area of said restriction to control feed of fuel to the burner, means for selectively controlling said element, a regulating valve controlling flow of fuel to said restriction, pressure-responsive means operatively connected to said valve and arranged to respond to the drop across said restriction, means tending to maintain a substantially constant differential across said pressure-responsive means, an increase or decrease in the drop across the metering restriction momentarily unbalancing the differential and causing the constant differential producing means to move the fuel valve to a position to re-establish the drop across the metering restriction, and means responsive to changes in pressure of the air flowing to the burner for modifying the differential across said pressure-responsive means.

2. For use in a fuel-feeding system for power plants utilizing a burner or generator to which air is supplied under pressure, a fuel conduit for conducting fuel to the burner having a variable metering restriction therein, means for creating a flow of fuel under pressure through said conduit, an element for varying the area of said restriction to control feed of fuel to the burner, means for selectively controlling said element, a regulating valve controlling flow of fuel to said restriction, pressure-responsive means operatively connected to said valve and arranged to respond to the drop across said restriction, means tending to maintain a substantially constant differential across said pressure-responsive means, an increase or decrease in the drop across the metering restriction momentarily unbalancing the differential and causing the constant differential producing means to move the fuel valve to a position to reestablish the drop across the metering restriction, and means responsive to changes in temperature of the air flowing to the burner for modifying the differential across said pressure-responsive means.

3. For use in a fuel-feeding system for aircraft power plants utilizing a burner or generator to which air is supplied under pressure, a fuel conduit for conducting fuel from a source of fuel under pressure to the burner and having a variable feed restriction therein, an element for varying the area of said restriction, means for selectively controlling said element, a valve for regulating the flow of fuel to said restriction, a pressure-responsive device such as a diaphragm connected to said valve, means defining two pressure chambers in pressure communication with opposite sides of said diaphragm, a restricted orifice or bleed communicating said chambers, one of said chambers being in flow communication with the high-pressure side of said metering restriction, another restricted orifice or bleed communicating the other of said chambers with the low-pressure side of the metering restriction, means tending to maintain a substantially constant differential pressure across said diaphragm at all positions of said element, and means responsive to changes in density of the air flowing to the burner controlling one of said restricted orifices or bleeds to vary the differential across said feed restriction at a given position of said element.

4. For use in a fuel-feeding system for aircraft power plants utilizing a gas turbine and a burner or generator to which air is supplied under pressure, a housing provided with a fuel conduit having a variable feed or metering restriction therein, means for creating a flow of fuel under pressure through said conduit, an element for varying the area of said restriction, a power control member operatively connected to said element for accelerating and decelerating the speed of the turbine by selecting a rate of fuel feed commensurate with the desired speed, a governor driven in relation to the speed of the turbine operatively connected to said element and having a resilient connection with said member to maintain the element in a position of equilibrium at a selected speed, a valve port in said conduit and a regulating valve controlling said port, a diaphragm connected to said valve and in conjunction with the adjacent wall of the housing providing a first chamber in communication with the discharge side of said port and the high pressure side of said feed restriction and a second chamber communicating through a restricted orifice with the low pressure side of said feed restriction, another restricted orifice communicating said chambers, a spring representing a constant engaging said diaphragm for maintaining a substantially constant differential across the diaphragm, variations in the area of said feed restriction momentarily unbalancing the differential set by said spring causing the latter to adjust the regulator valve to reestablish the differential across said feed restriction, a needle controlling the area of one of said restricted orifices, and a capsule responsive to changes in density of the air flowing to the burner controlling said needle, variation in the area of the orifice controlled by said needle at a given position of said element modifying the metering differential across the said feed restriction.

5. For use in a fuel-feeding system for aircraft power plants utilizing a burner or generator to which air is supplied under pressure, a housing provided with a fuel conduit having a variable feed or metering restriction therein, a fuel feed control element for varying the area of said feed restriction, a valve port in said conduit and a coacting regulator valve controlling the area of said port, a diaphragm connected to the regulator valve and in conjunction with the adjacent wall of the housing providing a first chamber in communication with the discharge side of said port and the unmetered fuel side of said variable feed restriction and a second chamber communicating with said first chamber through a restricted orifice or bleed, a passage having another restricted orifice or bleed therein communicating said second chamber and the metered fuel side of said variable feed restriction, a spring functioning to maintain a substantially constant differential pressure across said diaphragm, variation in the area of said feed restriction momentarily unbalancing the differential across the diaphragm set by said spring whereupon the latter adjusts said regulator valve to reestablish the differential, a needle arranged to vary the area of one of said restricted orifices or bleeds, and a capsule responsive to changes in density of the air flowing to the burner controlling said needle, variation in the area of the orifice controlled by said needle at a given position of said fuel feed control element modifying the metering differential across the feed restriction.

6. For use in a fuel-feeding system for aircraft power plants utilizing a gas turbine and a burner or generator to which air is supplied under pressure, a fuel conduit for conducting fuel under pressure to the burner having a variable metering restriction therein, a throttle valve controlling said restriction, a power control member for accelerating and decelerating the speed of the turbine by selecting a rate of fuel feed commensurate with the desired speed, a governor adapted to be driven in relation to the speed of the turbine operatively connected to said throttle valve and said member to maintain the valve in a position of equilibrium at a selected speed, means for regulating the flow of fuel to said restriction including a regulator valve and means controlling said latter valve to maintain a substantially constant differential pressure across said restriction, a passage having a variable orifice therein for by-passing unmetered fuel around said restriction, and means responsive to changes in density of the air flowing to the burner controlling said variable orifice to vary the differential across the feed restriction at a given position of the throttle valve.

7. For use in a fuel-feeding system for aircraft power plants utilizing a gas turbine and a burner or generator to which air is supplied under pressure, a fuel conduit for conducting fuel under pressure to the burner having a variable feed restriction therein, a throttle valve controlling said restriction, a power control member for accelerating and decelerating the speed of the turbine by selecting a rate of fuel feed commensurate with the desired speed, a governor adapted to be driven in relation to the speed of the turbine operatively connected to said throttle valve and said member to maintain the valve in a position of equilibrium at a selected speed, means for by-passing unmetered fuel around said restriction including a by-pass flow orifice, an element for varying the area of said orifice, and means responsive to changes in pressure of the air flowing to the burner controlling said element.

8. For use in a fuel-feeding system for aircraft power plants utilizing a gas turbine and a burner or generator to which air is supplied under pressure, a fuel conduit for conducting fuel under pressure to the burner having a variable feed restriction therein, a throttle valve controlling said restriction, a power control member for accelerating and decelerating the speed of the turbine by selecting a rate of fuel feed commensurate with the desired speed, a governor adapted to be driven in relation to the speed of the turbine operatively connected to said throttle valve and said member to maintain the valve in a position of equilibrium at a selected speed, means for by-passing unmetered fuel around said restriction including a by-pass flow orifice, an element for varying the area of said orifice, and means responsive to changes in temperature of the air flowing to the burner controlling said element.

9. A device for regulating the feed of fuel to the burner or generator of power plants for aircraft utilizing a gas turbine, including a fuel conduit to which fuel is supplied under pressure having a feed restriction therein, a feed valve controlling said restriction, a power control lever, a resilient connection between said lever and valve, a governor adapted to be driven in relation to the speed of the turbine operatively connected to the valve and said lever to maintain the valve in a position of equilibrium at a speed selectable by said lever, means for positively determining the idle position of the valve, means for maintaining a substantially constant differential pressure across said valve at any given condition of entering air density, means for varying said differential in relation to changes in density, and means having a constantly open orifice for by-passing fuel around said valve to the burner to maintain a minimum flow of fuel at the idle position of the valve irrespective of the differential across said valve.

10. In a device for feeding fuel to a burner or generator forming part of an aircraft power plant to which air is supplied under pressure, a fuel conduit having a variable feed restriction therein, a feed valve coacting with said restriction for controlling the flow of fuel therethrough, a power control member operatively connected to said valve, means for determining the idle position of said valve, means for varying the differential across said valve, means responsive to changes in pressure of the air flowing to the burner controlling said varying means, and means having a constantly open orifice for by-passing fuel past said valve to the burner at all pressure conditions of the air flowing to the burner.

11. In a device for feeding fuel to a burner or generator forming part of an aircraft power plant to which air is supplied under pressure, a fuel conduit having a variable feed restriction therein, a feed valve coacting with said restriction for controlling the flow of fuel therethrough, a power control member operatively connected to said valve, means for determining the idle position of said valve, means for varying the differential across said valve, means responsive to changes in temperature of the air flowing to the burner controlling said varying means, and means having a constantly open orifice for by-passing fuel past said valve to the burner at all temperature conditions of the air flowing to the burner.

12. For use in a fuel-feeding system for aircraft engines utilizing a burner or generator to which air is supplied under pressure, a fuel conduit for conducting fuel under pressure to the burner having a feed restriction therein, a throttle valve controlling said restriction, a power control element for moving said valve to a position to drive the engine at a selected speed, an engine driven governor interposed between said valve and element, said governor having a resilient connection with said element, means for maintaining a substantially constant differential across said restriction for any given power setting of said control element, and means responsive to changes in pressure of the air flowing to the engine for modifying said differential.

13. For use in a fuel-feeding system for aircraft engines utilizing a burner or generator to which air is supplied under pressure, a fuel conduit for conducting fuel under pressure to the burner having a feed restriction therein, a throttle valve controlling said restriction, a power control element for moving said valve to a position to drive the engine at a selected speed, an engine driven governor interposed between said valve and element, said governor having a resilient connection with said element, means for maintaining a substantially constant differential across said restriction for any given power setting of said control element, and means responsive to changes in temperature of the air flowing to the engine for modifying said differential.

14. For use in a fuel-feeding system for aircraft engines utilizing a burner or generator to which air is supplied under pressure, a fuel conduit for conducting fuel under pressure to the burner having a feed restriction therein, a throttle valve controlling said restriction, a power control element for moving said valve to a position to drive the engine at a selected speed, an engine driven governor interposed between said valve and element, said governor having a resilient connection with said element, means for maintaining a substantially constant differential across said restriction for any given power setting of said control element, means responsive to changes in pressure of the air flowing to the engine for modifying said differential, and means for limiting the rate of fuel feed to a predetermined value irrespective of the force exerted by said governor on said valve.

15. For use in a fuel-feeding system for aircraft engines utilizing a burner or generator to which air is supplied under pressure, a fuel conduit for conducting fuel under pressure to the burner having a feed restriction therein, a throttle valve controlling said restriction, a power control element for moving said valve to a position to drive the engine at a selected speed, an engine driven governor interposed between said valve and element, said governor having a resilient connection with said element, means for maintaining a substantially constant differential across said restriction for any given power setting of said control element, means responsive to changes in temperature of the air flowing to the engine for modifying said differential, and means for limiting the rate of fuel feed to a predetermined value irrespective of the force exerted by said governor on said valve.

16. In a fuel control device for controlling the flow of fuel to the burner of a gas turbine engine, a fuel supply conduit, a valve in the conduit, a pair of stops limiting the maximum and minimum opening of the valve one of said stops being adjustable, a governor adapted to be driven by the turbine controlling the valve, manually operable means for varying the setting of the governor, a second valve in the conduit for controlling the fuel metering head across the governor controlled valve, and means responsive to variations in pressure of the air flowing to the engine controlling said second valve.

17. In a fuel control device for controlling the flow of fuel to the burner of a gas turbine engine, a fuel supply conduit, a valve in the conduit, a pair of stops limiting the maximum and minimum opening of the valve one of said stops being adjustable, a governor adapted to be driven by the turbine controlling the valve, manually operable means for varying the setting of the governor, a second valve in the conduit for controlling the fuel metering head across the governor controlled valve, and means responsive to variations in the temperature of the air flowing to the engine controlling said second valve.

18. The invention defined in claim 16 comprising in addition means for by-passing a substantially constant quantity of fuel per unit time around the governor controlled valve.

19. In a fuel control device for an engine, a fuel inlet passage, a fuel outlet passage, a pair of conduits in parallel interconnecting said passages, a metering valve in one of said conduits, manual means for regulating said valve to select an operating speed or power output for the engine, a fixed restriction and a variable restriction in the other of said conduits, valve means responsive to variations in pressure of the air flowing to the engine for varying the effective area of said variable restriction, a metering head regulating valve in one of said passages, and means responsive to the drop in pressure across one of said restrictions for controlling said regulating valve.

20. In a fuel control device for an engine, a fuel inlet passage, a fuel outlet passage, a pair of conduits in parallel interconnecting said passages, a metering valve in one of said conduits, manual means for regulating said valve to select an operating speed or power output for the engine, a fixed restriction and a variable restriction in the other of said conduits, valve means responsive to variations in temperature of the air flowing to the engine for varying the effective area of said variable restriction, a metering head regulating valve in one of said passages, and means responsive to the drop in pressure across one of said restrictions for controlling said regulating valve.

21. In a fuel control device for an engine having an inlet for unmetered fuel under pressure and an outlet for metered fuel flowing to the engine, a main flow passage communicating the inlet with the outlet and having a metering orifice therein, a passage in parallel with said main flow passage constituting a bleed-off density-compensating circuit also communicating the inlet with the outlet, a variable restriction and a fixed restriction arranged in series flow relationship in said bleed-off circuit, a valve for controlling said variable restriction and means responsive to changes in pressure of the air flowing to the engine for automatically positioning said valve, a regulator valve for controlling the head across said metering orifice and said variable restriction, and means responsive to the drop in pressure across one of said restrictions for automatically positioning said regulator valve.

22. In a fuel control device for an engine having an inlet for unmetered fuel under pressure and an outlet for metered fuel flowing to the engine, a main flow passage communicating the inlet with the outlet and having a metering orifice therein, a passage in parallel with said main flow passage constituting a bleed-off density-compensating circuit also communicating the inlet with the outlet, a variable restriction and a fixed restriction arranged in series flow relationship in said bleed-off circuit, a valve for controlling said variable restriction and means responsive to changes in temperature of the air flowing to the engine for automatically positioning said valve, a regulator valve for controlling the head across said metering orifice and said variable restriction, and means responsive to the drop in pressure across one of said restrictions for automatically positioning said regulator valve.

FRANK C. MOCK.

References Cited in the file of this patent

UNITED STATES PATENTS

| Number | Name | Date |
|---|---|---|
| 1,593,601 | Rush | July 27, 1926 |
| 1,787,686 | Kerr | Jan. 6, 1931 |
| 2,117,963 | Kalbreier | May 17, 1938 |
| 2,238,905 | Lysholm | Apr. 22, 1941 |
| 2,277,075 | Dahl | Mar. 24, 1942 |
| 2,307,974 | Turner | Jan. 12, 1943 |
| 2,353,929 | Ray | July 18, 1944 |
| 2,384,340 | Reggio | Sept. 4, 1945 |
| 2,405,888 | Holley | Aug. 13, 1946 |
| 2,407,115 | Udale | Sept. 3, 1946 |
| 2,422,808 | Stokes | June 24, 1947 |

FOREIGN PATENTS

| Number | Country | Date |
|---|---|---|
| 403,440 | Great Britain | Dec. 28, 1933 |
| 560,196 | Great Britain | Mar. 24, 1944 |